(12) United States Patent
Tankala et al.

(10) Patent No.: US 7,003,206 B2
(45) Date of Patent: Feb. 21, 2006

(54) CLADDING-PUMPED OPTICAL FIBER AND METHODS FOR FABRICATING

(75) Inventors: Kanishka Tankala, South Windsor, CT (US); Adrian Carter, Bulli (AU)

(73) Assignee: Nufern, East Granby, CT (US)

( * ) Notice: Subject to any disclaimer, the term of this patent is extended or adjusted under 35 U.S.C. 154(b) by 0 days.

(21) Appl. No.: 10/875,749

(22) Filed: Jun. 24, 2004

(65) Prior Publication Data

US 2005/0008313 A1    Jan. 13, 2005

Related U.S. Application Data

(60) Continuation of application No. 10/287,322, filed on Nov. 4, 2002, now Pat. No. 6,779,364, which is a division of application No. 09/694,549, filed on Oct. 23, 2000, now Pat. No. 6,477,307.

(51) Int. Cl.
*G02B 6/22* (2006.01)
*C03B 37/075* (2006.01)

(52) U.S. Cl. .......................................... 385/127; 65/390
(58) Field of Classification Search ................. 65/390, 65/397, 402, 403, 412, 421, 427; 385/123–127, 385/146

See application file for complete search history.

(56) References Cited

U.S. PATENT DOCUMENTS

| | | | |
|---|---|---|---|
| 3,729,690 A | 4/1973 | Snitzer | 372/40 |
| 3,808,549 A | 4/1974 | Maurer | 372/6 |
| 4,173,393 A | 11/1979 | Maurer | 385/142 |
| 4,315,666 A | 2/1982 | Hicks, Jr. | 385/30 |
| 4,546,476 A | 10/1985 | Shaw et al. | 372/6 |
| 4,701,614 A | 10/1987 | Jaeger et al. | 250/227.14 |
| 4,709,986 A | 12/1987 | Hicks, Jr. | 385/126 |
| 4,815,079 A | 3/1989 | Snitzer et al. | 372/6 |
| 5,121,460 A | 6/1992 | Tumminelli et al. | 385/126 |
| 5,259,059 A | 11/1993 | Abramov | 385/123 |
| 5,317,667 A | 5/1994 | Weber et al. | 385/147 |
| 5,319,652 A | 6/1994 | Moeller et al. | 372/6 |
| 5,349,590 A | 9/1994 | Amirkhanian et al. | 372/6 |
| 5,371,815 A | 12/1994 | Poole | 382/28 |

(Continued)

FOREIGN PATENT DOCUMENTS

EP    1 043 816 A2    11/2000

(Continued)

OTHER PUBLICATIONS

U.S. Appl. No. 10/820,475, filed Apr. 8, 2004, Samson et al.

(Continued)

*Primary Examiner*—Georgia Epps
*Assistant Examiner*—William Choi
(74) *Attorney, Agent, or Firm*—Peter J. Rainville (57) ABSTRACT

Disclosed is an optical fiber article for receiving pump radiation of a first wavelength for amplifying or generating radiation of a second wavelength. The optical fiber article includes a core for propagating light of the second wavelength. The core has a first index of refraction and includes a rare earth material. A cladding surrounds the core and has a second index of refraction that is less than the first index of refraction. The outer circumference of the cladding can include a plurality of sections, where the plurality of sections includes at least one substantially straight section and one inwardly curved section. The optical fiber article can also include at least one outer layer surrounding the cladding, where the index of refraction of the outer layer is less than the second refractive index. Methods for producing the optical fiber article are also disclosed, as well as methods for providing a preform for drawing such an optical fiber article.

29 Claims, 6 Drawing Sheets

U.S. PATENT DOCUMENTS

| | | | |
|---|---|---|---|
| 5,402,966 A | 4/1995 | von Hoessle | 244/3.12 |
| 5,418,880 A | 5/1995 | Lewis et al. | 385/123 |
| RE35,020 E | 8/1995 | Quinlan, Jr. | 385/13 |
| 5,482,525 A * | 1/1996 | Kajioka et al. | 65/398 |
| 5,533,163 A | 7/1996 | Muendel | 385/126 |
| 5,756,209 A | 5/1998 | Hale | 428/392 |
| 5,761,234 A | 6/1998 | Craig et al. | 372/75 |
| 5,822,489 A | 10/1998 | Hale | 385/145 |
| 5,864,644 A | 1/1999 | DiGiovanni et al. | 385/43 |
| 5,864,645 A | 1/1999 | Zellmer et al. | 385/126 |
| 5,873,923 A | 2/1999 | DiGiovanni | 65/390 |
| 5,898,715 A | 4/1999 | LeGrange et al. | 372/6 |
| 5,949,941 A | 9/1999 | DiGiovanni | 385/127 |
| 5,966,491 A | 10/1999 | DiGiovanni | 385/127 |
| 6,031,850 A | 2/2000 | Cheo | 372/6 |
| 6,044,190 A | 3/2000 | Kashyap | 385/123 |
| 6,101,199 A | 8/2000 | Wang et al. | 372/6 |
| 6,115,526 A | 9/2000 | Morse | 385/125 |
| 6,154,595 A | 11/2000 | Yokogawa et al. | 385/127 |
| 6,157,763 A | 12/2000 | Grubb et al. | 385/126 |
| 6,192,713 B1 | 2/2001 | Zhang et al. | 65/390 |
| 6,263,003 B1 | 7/2001 | Huang et al. | 372/6 |
| 6,304,705 B1 | 10/2001 | Kalish et al. | 385/128 |
| 6,317,537 B1 | 11/2001 | Ionov et al. | 385/32 |
| 6,345,141 B1 | 2/2002 | Grubb et al. | 385/127 |
| 6,411,762 B1 | 6/2002 | Anthon et al. | 385/123 |
| 6,477,307 B1 | 11/2002 | Tankala et al. | 385/127 |
| 6,483,973 B1 | 11/2002 | Mazzarese et al. | 385/123 |
| 6,625,363 B1 | 9/2003 | Carter et al. | 385/127 |
| 6,687,445 B1 | 2/2004 | Carter et al. | 385/127 |
| 6,718,106 B1 | 4/2004 | Tardy et al. | 385/123 |
| 6,779,364 B1 | 8/2004 | Tankala et al. | 65/390 |
| 2004/0069019 A1 | 4/2004 | Carter et al. | 65/414 |
| 2004/0086245 A1 | 5/2004 | Farroni et al. | 385/123 |

FOREIGN PATENT DOCUMENTS

| | | |
|---|---|---|
| WO | WO 93/15536 A1 | 8/1993 |
| WO | WO 99/30391 A1 | 6/1999 |
| WO | WO 02/059660 A1 | 8/2002 |

OTHER PUBLICATIONS

U.S. Appl. No. 10/910,924, filed Aug. 3, 2004, Farroni et al.

* cited by examiner

FIG. 6B

CLADDING-PUMPED OPTICAL FIBER AND METHODS FOR FABRICATING

This application is a continuation of U.S. application Ser. No. 10/287,322 filed Nov. 4, 2002, now U.S. Pat. No. 6,779,364 which is a divisional of U.S. application Ser. No. 09/694,549, filed Oct. 23, 2000, now issued as U.S. Pat. No. 6,477,307. The foregoing applications are hereby incorporated by reference herein.

FIELD OF THE INVENTION

The present invention relates to fiber optic articles and, more particularly, to cladding-pumped fiber optic articles for lasers, amplifiers and the like.

BACKGROUND

Optical fiber lasers and amplifiers are known in the art. In such lasers and amplifiers, rare earth materials disposed in the core of the optical fiber laser or amplifier receive pump radiation of a predetermined wavelength and, responsive thereto, provide or amplify light of a different wavelength for propagation in the core. For example, the well known erbium doped fiber amplifier (EDFA) receives pump radiation having a wavelength of 980 or 1480 nanometers (nm) and amplifies an optical signal propagating in the core at a wavelength in the 1550 nm region.

In such optical fiber lasers and amplifiers, the pump radiation can be introduced directly to the core, which can be difficult due to the small size of the core, or can be introduced to the cladding surrounding the core and absorbed by the core as the rays propagating in the cladding intersect the core. Lasers and amplifiers with the pump radiation introduced to the cladding are known as "cladding-pumped" optical devices, and facilitate the scale-up of lasers and amplifiers to higher power systems.

Absorption per unit length is a useful figure of merit for evaluating a cladding-pumped optical fiber laser or amplifier. It is typically desirable that the amplifier or laser have a high absorption per unit length, indicating that the pump radiation frequently intersects the core. Unfortunately, when the cladding has a circular outer circumference, the pump radiation can essentially propagate down the optical fiber while spiraling around the core without substantially intersecting the core. This leads to a low absorption per unit length of the optical fiber device, and hence detracts from the performance of the optical fiber laser or amplifier.

Various approaches are known in the art for enhancing the intersection of the pump radiation with the core and hence raising the absorption per unit length of the optical fiber amplifier or laser. For example, as disclosed in U.S. Pat. No. 4,815,079, issued Mar. 21, 1989 to Snitzer et al., the core can be offset from the center of the optical fiber so as to enhance the intersection of pump light with the core. In another approach, the inner cladding has a "D"-shaped outer circumference that includes a flat section, as disclosed in U.S. Pat. No. 5,864,645, issued Jan. 26, 1999 to Zellmer et al. In another prior art optical fiber, the outer circumference of the cladding is shaped as a polygon, such as a diamond, as disclosed in U.S. Pat. No. 5,533,163, issued Jul. 2, 1996 to Muendel. Other approaches include providing a star-shaped outer circumference of the cladding, as disclosed in U.S. Pat. No. 5,949,941, issued Sep. 7, 1999 to DiGiovanni. See also WO 99/30391, published Jun. 17, 1999, disclosing an optical fiber having a core, inner and outer claddings, and a series of perturbations or irregularities formed in the otherwise circular outer boundary of the inner cladding. The optical fiber is drawn from a preform having rods inserted into holes drilled into the preform for producing the irregularities.

In the foregoing prior art fibers, the non-circular shape of the outer circumference is understood to cause ray distortion and mode mixing of light, thereby directing the light rays of the cladding radiation to the core, and avoiding trapping light in spiral paths that do not intersect the core.

The designs discussed above can have disadvantages. For example, a fiber having an offset core can be difficult to interconnect with other optical components. Designs, such as the diamond and polygon designs discussed above, that require the circumference of the cladding to predominately consist of flat areas, can be difficult to fabricate. The flat areas, which are typically first machined into the preform from which the optical fiber is drawn, tend to deform and change shape when the fiber is drawn at the most desirable temperatures. Accordingly, often the draw temperature is reduced to preserve the desired shape of the outer circumference of the cladding. A reduced draw temperature typically produces optical fibers having higher attenuation and lower mechanical strength. In addition, the star shaped configuration disclosed in U.S. Pat. No. 5,949,941 can be difficult to manufacture. Accordingly, an improved cladding-pumped optical device and/or techniques for manufacturing such optical fiber devices would be a welcome advance in the art.

It is desirable to address one or more of the foregoing disadvantages and drawbacks of the prior art.

SUMMARY OF THE INVENTION

According to the preferred embodiment, an optical fiber article for receiving pump radiation of a first wavelength for amplifying or generating radiation of a second wavelength includes a core for propagating light of the second wavelength. The core has a first refractive index and includes a rare earth material. A cladding surrounds the core and has a second refractive index that is lower than the first refractive index. The outer circumference of the cladding includes a plurality of sections, where the plurality of sections includes at least one straight section and one inwardly curved section. An outer layer surrounds the cladding and has an index of refraction that is less than the second index of refraction.

It is considered that the combination of the straight and inwardly curved sections in the outer circumference of the cladding enhances scattering of the pump radiation for more effective absorption of the pump radiation by the core. For example, the inwardly curved section can intercept the pump light reflected from the straight section in a substantially different direction, thus achieving a higher degree of randomization of the paths of the light rays of the pump light for increased interception of the light by the core of the optical fiber article.

Preferably, an optical fiber article in accordance with the invention includes four to twelve sections, where each section of the four to twelve sections is one of inwardly curved and substantially straight. Other sections shaped other than straight or inwardly curved may be present as well. The inwardly curved and straight sections can alternate about the circumference of the cladding. Preferably, each of the inwardly curved sections is spaced from the core of the optical fiber article, at its point of closest approach to the core of the optical fiber article, by a distance that is less than or equal to the spacing between any one of the straight sections and the core at the point of closest approach of any one of the straight sections to the core.

In other aspects of the invention, each of the straight sections is intersected at a substantially perpendicular angle by a different radial vector, and each of the inwardly curved sections are intersected at a substantially perpendicular angle by a different one of other radial vectors. The different radial vectors are spaced by a first angle, and the other radial vectors are spaced by a second angle substantially equal to the first angle. Preferably, the straight sections are longer than the inwardly curved sections.

The optical fiber can be adapted for single mode propagation at the second wavelength, or alternatively, for propagating a plurality of modes at the second wavelength. As is known in the art, in certain fiber designs the core and/or the cladding can be characterized by more than one index of refraction. For example, it is known for the core to have a segmented refractive index profile to broaden the mode fields. Graded index fibers are also known. However, fibers having a core and/or cladding characterized by more than one index of refraction are within the scope of the invention, because for total internal reflection to facilitate guiding light in the core, the cladding includes an index of refraction that is less than an index of refraction of the core, as is well known in the art.

The invention can also include methods practiced in accordance with the teachings herein.

In one aspect, the invention provides a method of making an optical fiber article having an optical fiber core and an optical fiber cladding surrounding the optical fiber core. The method can include the following steps: providing a preform having a preform core and a preform cladding surrounding the preform core, where the preform core includes a rare earth material and has a selected index of refraction, and the preform cladding has an index of refraction less than the selected index of refraction; forming at least one slot in the preform cladding; forming at least one flat area in the preform cladding; and drawing the preform to form the optical fiber article such that the optical fiber article includes an optical fiber core surrounded by an optical fiber cladding having an index of refraction that is less than the index of refraction of the optical fiber core, and wherein the optical fiber cladding includes an outer circumference having at least one inwardly curved section and at least one straight section. In another aspect of the invention, the preform can be drawn at a higher temperature more conducive to providing a lower attenuation and higher strength optical fiber article.

A glass jacket, having an index of refraction that is less than the index of refraction of the preform cladding, can be disposed about the preform cladding and drawn with the preform to provide an optical fiber article having a glass outer layer surrounding the cladding. The glass jacket can be collapsed, such as by heating, onto the preform cladding. The outer circumference of the glass jacket can be shaped, such as to reduce the depth of indentations or depressions in the glass jacket.

In another aspect of the invention, glass soot is deposited on the preform cladding and heated to form a preform outer layer.

The foregoing and other objects, features and advantages of the present invention will be apparent from the following description and accompanying drawings.

DETAILED DESCRIPTION OF THE INVENTION

Figure 1A:
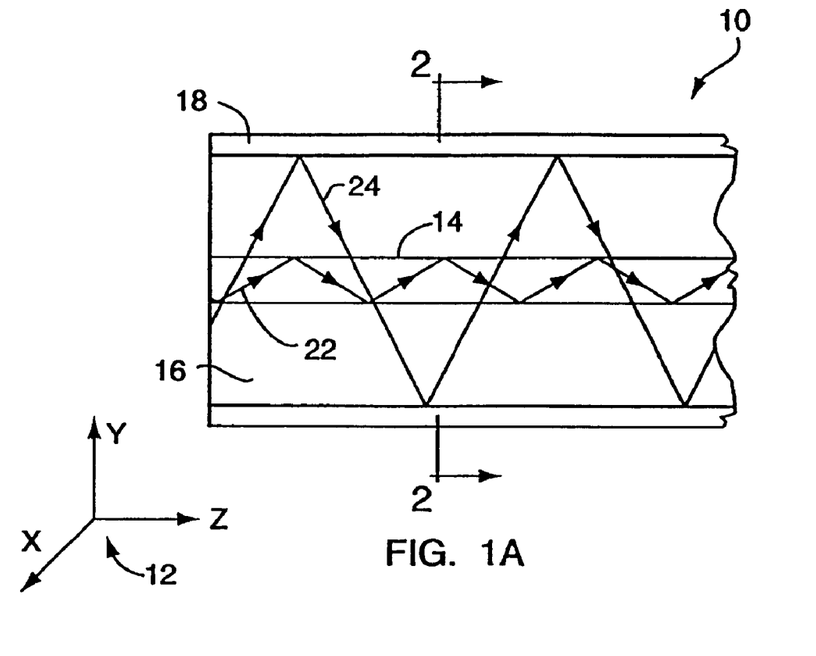
FIG. 1A shows a cross section of an optical fiber article that includes a core and cladding surrounding the core.

FIG. 1A is a cross sectional view of an optical fiber article 10 that extends in the longitudinal, or Z, direction, as identified by the coordinate system 12. The optical fiber article 10 includes a core 14, a cladding 16 that surrounds the core 14, and can also include the outer layer 18 that surrounds the cladding 16. The cladding 16 includes a lower index of refraction than the core 14 such that the laser light 22 to be amplified or generated is confined largely to the core 14. The outer layer 18 includes a lower index of refraction than the cladding 16 such that the pump radiation 24 is confined largely to the cladding 16. A second outer layer, which can include a plastic or polymer or other similar material, can surround the outer layer 18 for protecting the optical fiber article 10.

The core 14 typically includes one or more rare earth dopants, which can be selected from the Lanthanide group of elements in the periodic table, in a glass matrix, which can be a silica glass matrix. The silica glass matrix can include one or more other dopants, such as Ge, P, Al, B, F, etc., and which can be added for a variety of reasons, such as to modify the refractive index of the core 14 or to improve the performance of the rare earth dopants in the core 14. When the pump radiation 24 intersects the core 14, the pump radiation 24 is absorbed by the rare earth materials, such as erbium, in the core 14 for amplifying or generating the laser light 22, which has a different wavelength than the pump radiation 24. The outer layer 18 cladding can include a low index polymer or a low index glass.

Figure 1B:
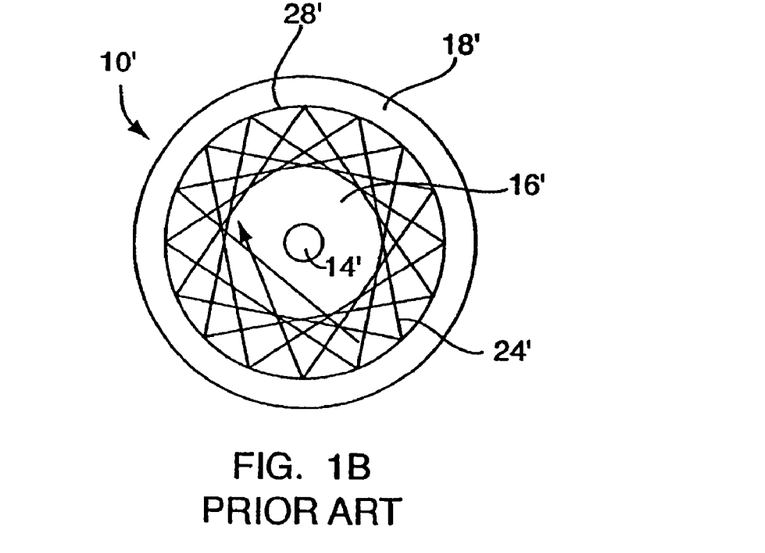
FIG. 1B is a cross section of a typical prior art optical fiber having a cladding that includes a circular outer circumference.
Figure 2A:
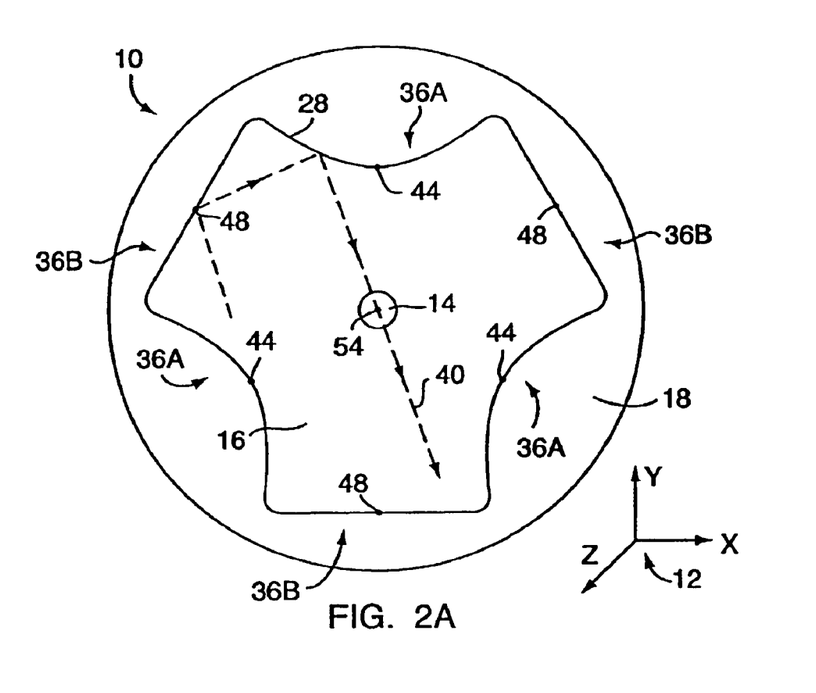
FIG. 2A depicts a cross section of one embodiment of an optical fiber article according to the invention.
Figure 2B:
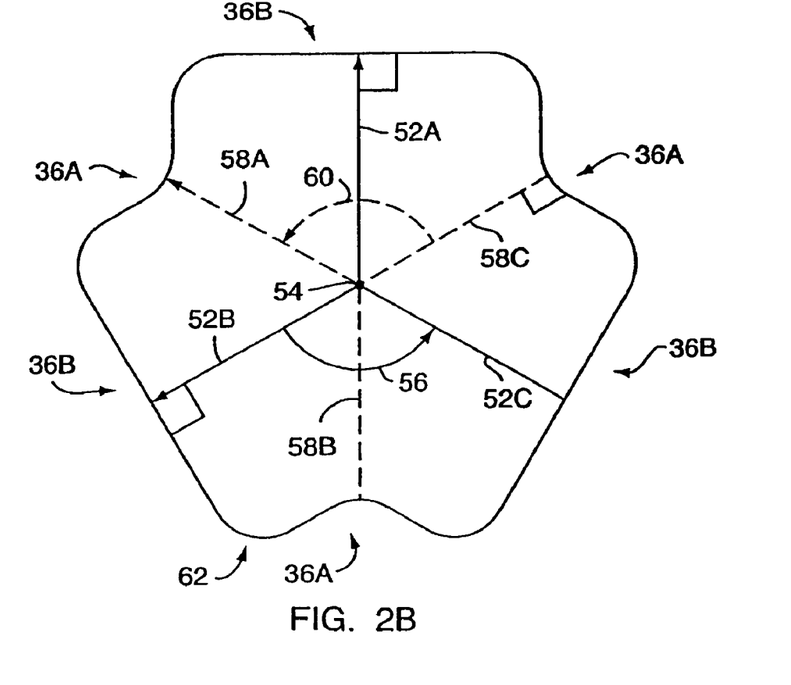
FIG. 2B depicts a cross section of another optical fiber article according to the invention.

FIGS. 2A and 2B are cross sections of optical fiber articles according to the invention, and are described below. However, an understanding of the problem addressed by the present invention can be furthered by first considering FIG. 1B, which is a cross section of a typical prior art optical fiber having a cladding 16' with a circular outer circumference 28'. Note that the pump radiation 24' can spiral around the core 14' without intersecting the core 14', leading to a low absorption per unit length of the pump radiation 24' by the core 14'.

FIG. 2A illustrates a cross section of one embodiment of an optical fiber article 10 according to the invention. The outer circumference 28 of the cladding 16 that surrounds the core 14 includes a plurality of sections 36 including inwardly curved sections 36A and straight sections 36B. It is considered that the combination of straight sections 36B and inwardly curved sections 36A increases the intersection of the core 14 by the pump radiation 24 that propagates in the cladding 16.

The inwardly curved section 36A can be located with the straight section 36B, along the outer circumference of the cladding, such that the inwardly curved section 36A intercepts pump light reflected from the straight section 36B in a substantially different direction, thus achieving higher degree of randomization of the path of the light rays of the pump light 24. This leads to increased interception of the pump light 24 by the core 14 of the optical fiber article 10. For example, ray 40 is shown reflecting off one of the straight sections 36B and then off of inwardly curved section 36A for reflection through the core 14.

Shown in FIG. 2A are three (3) straight sections 36B and three (3) inwardly curved sections 36A. However, it is considered that the invention can be practiced with fewer or more curved and straight sections than are shown in FIG. 2A. Preferably, the straight sections 36B and inwardly curved sections 36A jointly number from four to twelve sections. Not all the sections that make up the outer circumference of the cladding need be straight or inwardly curved. For example, it may be desirable to interpose sections having other shapes along the circumference 28 of the cladding 16. In the embodiment shown in FIG. 2A, the inwardly curved sections 36A alternate about the circumference with the straight sections 36B.

Though any number of inwardly curved sections 36A and straight sections 36B can be used to scatter the pump light 24, and the present invention is not to be limited to a particular length and curvature of the inwardly curved sections or to a particular length of the straight sections 36B, the following considerations are noted. If the outer circumference 28 includes very few sections, the overall shape of the circumference 28 can deviate from a circular shape, tending to make the optical fiber article 10 difficult to cleave and/or splice with conventional circular fibers. Conversely, as the number of sections is increased, the shape of the circumference 28 tends to become circular and the scattering of the pump light 24, and hence absorption by the core 14, can be reduced.

Preferably, each of said inwardly curved sections 36A is spaced, at its point of closest approach 44 to the core 14 of the optical fiber article 10, a distance from the core 14 that is less than or equal to the spacing between any one of the straight sections 36B and the core 14 at the point of closest approach 48 of that one straight section to the core 14. The straight sections 36B can be recessed relative to the curved sections 36A.

FIG. 2B serves to illustrate additional features that can be included in an optical fiber article 10 of the invention. Note that each of the straight sections 36B can be intersected at a substantially perpendicular angle by one of the different radial vectors 52A–52C, which extend from the center 54 of the optical fiber article 10. The radial vectors 52A–52C are spaced by substantially the same angle, represented by the angle 56 in FIG. 2B. Furthermore, each of the inwardly curved sections 36A can be substantially perpendicularly intersected by a different one of other radial vectors 58A–58C, and the other radial vectors are spaced by substantially the same angle, represented by the angle 60 in FIG. 2B. In one embodiment of the invention, the angle 60 is substantially equal to the angle 56. As shown in FIG. 2B, the straight sections 36B are preferably longer than said inwardly curved sections 36A.

Note that the outer circumference of the cladding 16 can also include short sections that are outwardly curved, such as sections 62, typically formed during the drawing process described below.

Figure 3A:
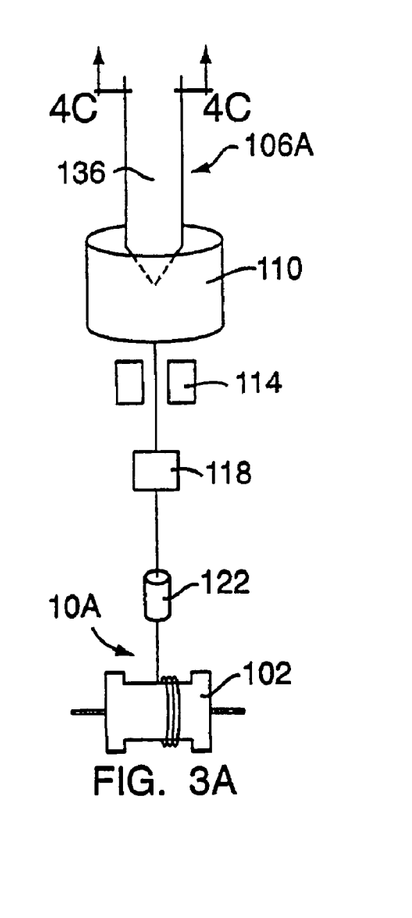
FIG. 3A schematically illustrates drawing an optical fiber from a preform.

FIG. 3A schematically illustrates drawing an optical fiber article 10A from a preform 106A. The preform 106A can be made by one of several methods, including vapor phase axial deposition, outside vapor deposition (OVD), or modified chemical vapor deposition (MCVD), as well as other methods known to those of ordinary skill in the art. A furnace 110, such as a high frequency induction furnace or a resistance furnace, heats the preform 106A. A spool 102 pulls the optical fiber article 10A from the preform 106A as the preform is heated by the furnace 110. A diameter measuring element 114 can be included for monitoring the diameter of the drawn optical fiber article 10A. A coating apparatus 118 can be included for providing additional coatings, such as the outer coating 18, over the cladding 16. Apparatus 122 can also be included for curing the optical fiber article 10A before it is wound on the spool 102. A coating or coatings can be added to the fiber article 10A after the processing by the apparatus shown in FIG. 3. The arrangement of apparatus shown in FIG. 3A is exemplary; the term "drawing", as used herein, refers to heating glass and pulling a strand of fiber from the glass.

Figure 4A:
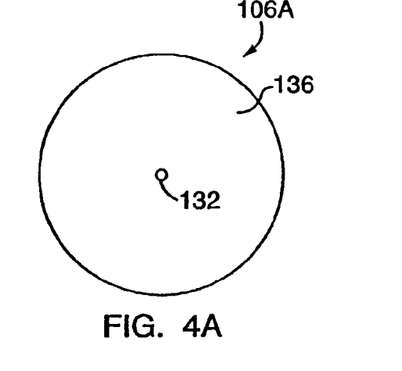
FIG. 4A is a cross section of a circular preform having a preform core and a preform cladding.
Figure 4B:
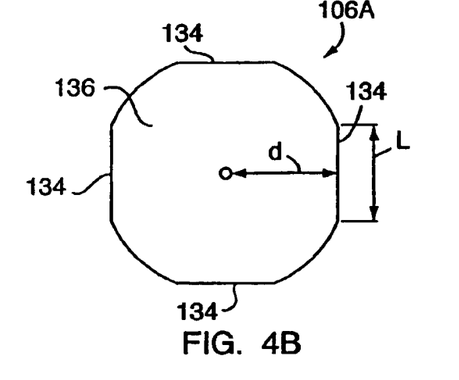
FIG. 4B illustrates flat areas formed in the preform cladding of the preform of FIG. 4A.
Figure 4C:
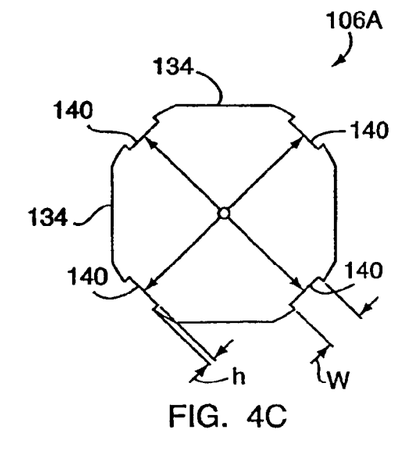
FIG. 4C illustrates slots formed in the preform cladding of the preform of FIG. 4B.

FIGS. 4A–4C illustrate the forming of the preform 106A such that it is suitable for facilitating provision of an outer circumference 28 having inwardly curved sections 36A and straight sections 36B. FIG. 4A is a cross section of the substantially circular preform 106A and illustrates the preform core 132 and the preform cladding 136, from which, respectively, the core 14 and cladding 16 of the optical fiber article 10A are formed. The preform core 132 can be doped with rare earth ions (for example, one or more of the Lanthanides, such as Er, Yb, Nd, Tm, Ho, etc.) and other preferred dopants (for example, one or more of Ge, P, Al, F, B, etc.). The preform 106A can be made by conventional methods known to those of ordinary skill in the art of making preforms.

As illustrated in FIG. 4B, various substantially flat areas 134 are formed, such as by machining, on the substantially round preform 106A. The substantially flat areas 134 typically extend longitudinally along the preform 106A. The substantially flat areas 134 facilitate formation of the straight sections 36B of the optical fiber article 10A upon drawing of the preform. For example, in the particular case shown in FIG. 4B, flat areas 134 that are disposed at 90 degrees from each other are machined in the preform 106A. Note the distance "d" of the flat area 134 to the center of the preform 106A can be varied. If R is the radius of the glass preform, the dimension d is preferably as follows: $0.7R \leq d \leq 0.97R$. More preferably, d is as follows: $0.8R \leq d \leq 0.96R$. Most preferably, d is given by: $0.9R \leq d \leq 0.95R$.

As illustrated in FIG. 4C, slots 140, preferably rectangular in shape, can be formed, such as by machining, in the preform 106A. The slots 140 are typically formed between each pair of adjacent flat areas 134 and typically extend longitudinally along the preform 106A. The width "W" of the slot 140 and depth "h" of the slot 140 can be varied to give different shape of the resultant inwardly curved section 36A of the outer circumference 28 of the optical fiber article 10A. The selection of the dimensions W and h each can affect the curvature of the resultant inwardly curved section 36A of the circumference 28 of the cladding 16 of the optical fiber article 10A. The value of h preferably is as follows: $0.5(R-d) \leq h \leq 2.5(R-d)$. More preferably, h is as follows: $0.75(R-d) \leq h \leq 2.4(R-d)$. Most preferably, h is defined by $1.0(R-d) \leq h \leq 1.5(R-d)$. For a given length L of the flat areas 134 formed or to be formed on the preform 106A, W is preferably as follows: $0.1L \leq W \leq 0.9L$. More preferably, W is defined as follows: $0.2L \leq W \leq 0.7L$. Most preferably, W is defined as follows: $0.3L \leq W \leq 0.6L$.

Figure 4D:
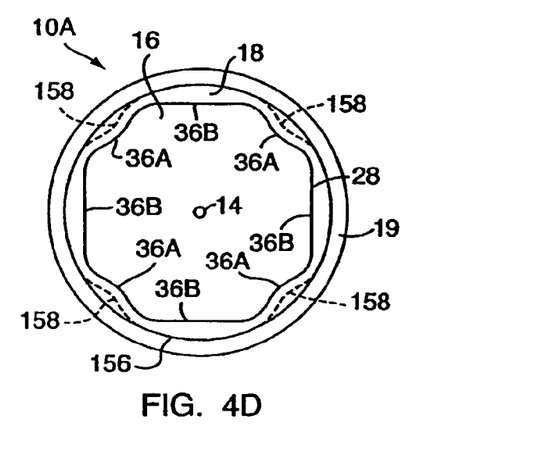
FIG. 4D is a cross section of an optical fiber article where at least the core and the cladding are formed from drawing the preform of FIG. 4C.

FIG. 4D is a cross section of the optical fiber article 10A having a core 14 and cladding 16 formed from drawing the preform of FIG. 4C. The slots 140 in the preform 106 facilitate the formation of inwardly curved section 36A in the outer circumference 28 of the cladding 16 and the flat areas 134 of the preform facilitate the formation of the straight sections 36B in the outer circumference 28 of the cladding 16. Note that the optical fiber article 10A in FIG. 4D includes four inwardly curved sections 36A and four straight sections 36B, and both the inwardly curved sections and the straight sections are, as is also shown in FIGS. 2A and 2B, substantially equally spaced about the outer circumference of the cladding 16. An outer layer 18 and a second outer layer 19 are shown in FIG. 4D, where one or both of the layers can be, for example, a polymer or plastic layer. One or both can be added prior to or after spooling of the drawn optical fiber article 10A.

Typically, the outer layer 18 includes a polymer layer selected such that the index of refraction of the layer 18 is lower than the index of refraction of the cladding 16. The second outer layer 19 can be an acrylic polymer or other polymer layer that is included for protecting the optical fiber article. Both can be added by a suitable coating apparatus 118, which can include chambers or coating cups, etc., as is known in the art.

Thus, according to the invention, there can be provided an improved optical fiber wherein the outer circumference of the cladding is selectively shaped. Prior art shaped fibers, such as those discussed in the Background Art section above, are typically drawn at temperatures substantially lower than those used when drawing standard round fiber. These reduced temperatures can be required to preserve the desired shape of the outer circumference of the cladding of the resultant drawn fiber. In the prior art processes, it is desired that the shape of the cross section of the preform becomes the shape of the outer circumference of the cladding of the resultant optical fiber. Drawing at the higher temperature tends to round the straight areas in the outer circumference of the cladding of the fibers, and can change the angle between the sections, and hence, according to the prior art, is often avoided. Unfortunately, drawing a fiber at reduced temperatures can have disadvantages, as the fibers tend to have higher light attenuation and are physically weaker than those drawn at higher temperatures. Thus, prior art fibers require a compromise.

In practicing the invention, a higher draw temperature can be used, and the rounding effect advantageously used to promote desired shapes of the outer circumference 28 of the cladding 16 of the optical fiber article 10, such as the formation of the inwardly curved surfaces 36A. The use of a higher temperature aids in achieving better fiber strength and lower attenuation. Furthermore, the combination of inwardly curved sections 36A and straight sections 36B is understood to enhance the intersection of the pump light 24 with the core 14.

The draw temperature is preferably selected to be high enough to allow flow and reshaping of the preform when drawn such that the slots 140 flow to become inwardly curved.

Figure 3B:
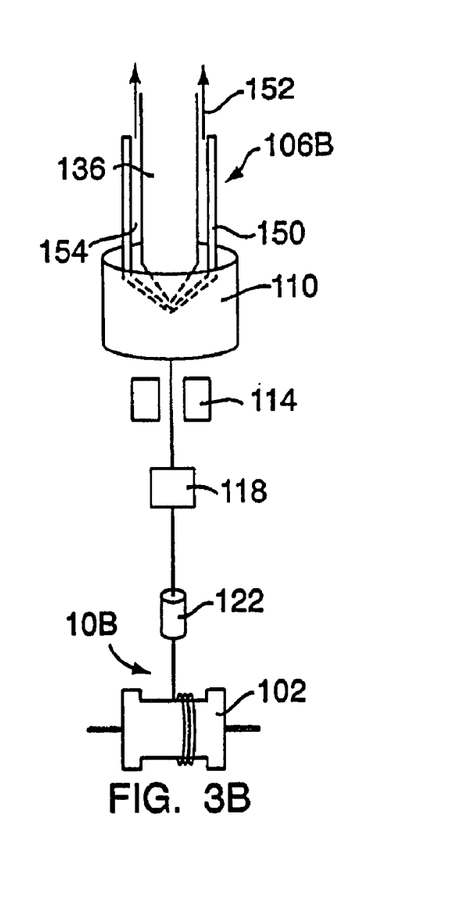
FIG. 3B schematically illustrates drawing an optical fiber from a preform and a glass jacket disposed about the preform cladding.

FIG. 3B illustrates an alternative approach for adding the outer layer 18. A jacket 150 is disposed about the preform 106B and is drawn with the preform 106B using the furnace 110. The jacket 150 is typically a cylinder of glass, and can include a fluorinated or borosilicate glass. The outer layer 18 is thus formed on the cladding 16 from the fluorinated or borosilicate glass. A vacuum is drawn as indicated by reference numeral 152, on the space 154 between the glass jacket 150 and the preform 106B. In the approach shown in FIG. 3B, the coating apparatus 118 can be used to add the outer layer 19, which can be a buffer layer, over the outer layer 18. An outer layer 18 that includes a glass is considered advantageous due to difficulties associated with polymer outer layers 18 that have the desired index of refraction lower than the index of refraction of the cladding layer 16. For example, fluorinated polymers can be inferior in terms of mechanical strength, permeability to moisture, and long-term reliability. However, the outer circumference 156 of layer 18 can include depressions or indentations formed where the outer layer 18 conforms to the slots 140 of the preform or to the inwardly curved sections 36A of the cladding 16. See, for example, reference numeral 158 in FIG. 4D.

Figure 3C:
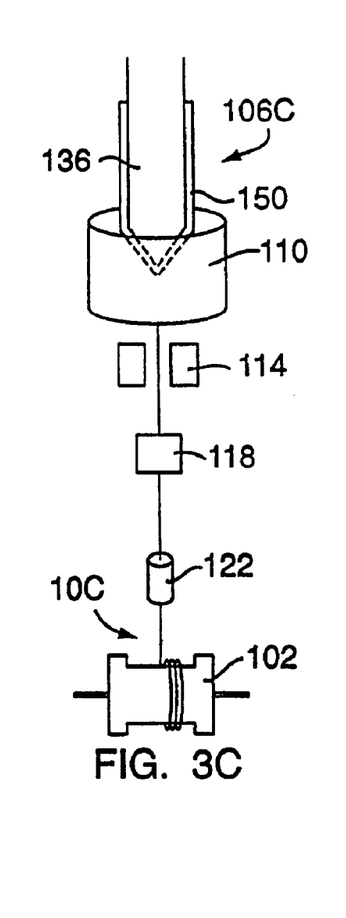
FIG. 3C schematically illustrates drawing an optical fiber from a preform, wherein the preform includes a glass jacket collapsed about the preform cladding.

In another approach, shown in FIG. 3C, the jacket 150 is collapsed onto the preform 106C prior to drawing of the optical fiber article 10C. As shown in FIG. 3C, the space 154 between the jacket 150 and the preform cladding 136 is reduced or eliminated.

Figure 5A:
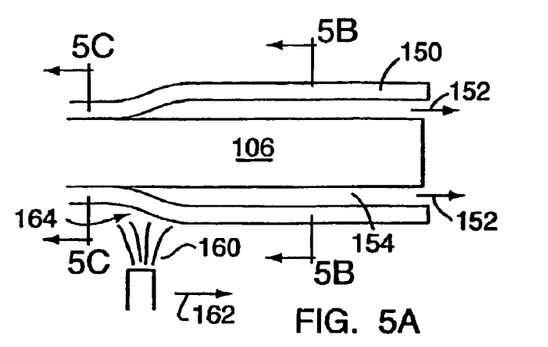
FIG. 5A illustrates collapsing the glass jacket of FIG. 3C about the preform of FIG. 3C.

FIG. 5A illustrates collapsing the jacket 150 of FIG. 3C about the preform 106C of FIG. 3C. As indicated by reference numeral 152, a vacuum is drawn on the space 154 between the preform 106C and the jacket 150, as a heat source 160, in this instance a flame, heats the jacket 150. The heat source 160 can be moved along the jacket 150, as indicated by reference numeral 162 to more evenly heat the jacket 150, thereby collapsing the jacket 150 onto the preform cladding 136, and adding the jacket 150 as a third layer to the preform 106C, as indicated by reference numeral 164. Typically the preform 106C and jacket 150 are rotated for evenly distributing the heat from the flame.

Figure 5B:
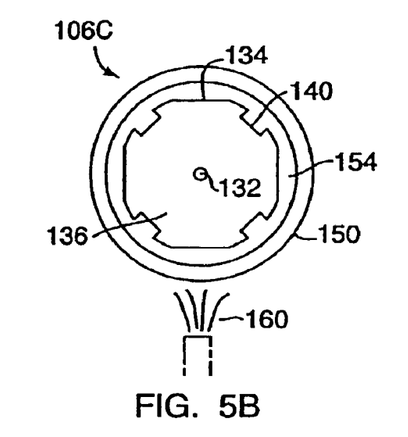
FIG. 5B is a cross section of the preform and the glass jacket of FIG. 5A, taken along section line 5B—5B of FIG. 5A.
Figure 5C:
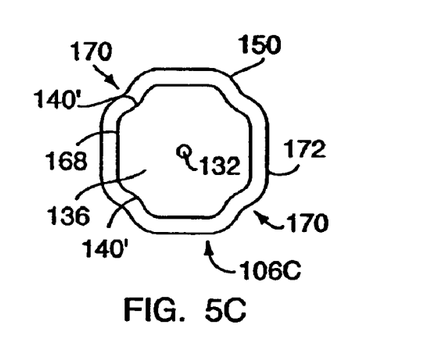
FIG. 5C is a cross section of the preform having the glass jacket collapsed thereon and taken along section line 5C—5C of FIG. 5A.

FIG. 5B is a cross section of the preform 106C and the jacket 150 of FIG. 5A, taken along section line 5B—5B of FIG. 5A, and FIG. 5C is a cross section of the preform 106C having the jacket 150 collapsed thereon and taken along section line 5C—5C of FIG. 5A. Note that the slots 140 have now become rounded, as indicated by reference numeral 140', forming inwardly curved sections in the outer circumference 168 of the preform cladding 136. Some rounding may also occur in the flat areas 134 of the preform cladding 136. It is also possible that the jacket 150, when collapsed as shown in FIG. 5C, includes depressions or indentations 170 that correspond to the location of the slots 140 in the preform cladding, such that the outer circumference 172 of the jacket 150 deviates from being circular. A fiber drawn from the preform 106C and jacket 150 can also therefore include an outer layer 18, formed from the jacket 150, that includes an outer circumference that deviates from circular, and includes the depressions and indentations 158 shown in FIG. 4D.

Figure 5D:
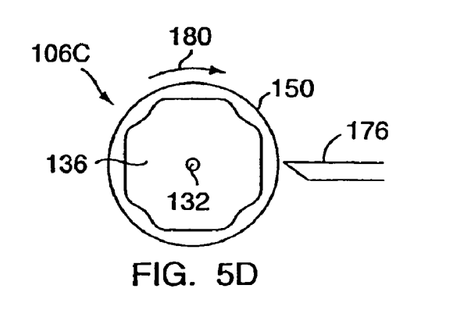
FIG. 5D illustrates shaping the preform and glass jacket of FIG. 5C.
Figure 5E:
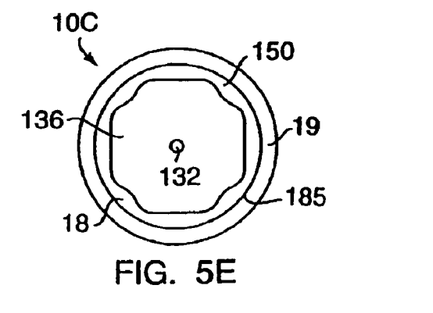
FIG. 5E illustrates a cross section of an optical fiber article drawn from the preform and glass jacket of FIG. 5D.

It is preferred that the outer circumference of the outer layer 18 of an optical fiber article 10 is characterized by a single diameter for facilitating mating of the optical fiber article 10 with other optical fibers or components. Accordingly, FIG. 5D illustrates shaping the preform 106C of FIG. 5C so as to reduce the depth of indentations or depressions 170 in the outer circumference thereof formed during the step of collapsing the jacket 150. Typically, the preform 106C is shaped via machining with a machine tool 176 of a lathe as the preform 106C is rotated, as indicated by reference numeral 180, such that the outer circumference 172 of the jacket 150 becomes substantially circular. The preform can also be shaped via grinding, such as by centerless grinding techniques, or by other shaping techniques understood by those of ordinary skill to be appropriate. FIG. 5E illustrates a cross section of the optical fiber article 10C drawn from the preform 106C including the jacket 150 of FIG. 5D. The second outer layer 19 is added, such as by the coating apparatus 118 in FIG. 3C. In the embodiment shown in FIG. 5E, the outer circumference 185 of the outer layer 18 is substantially circular, and can be characterized by single diameter when specifying connecting the optical fiber article 10 to other optical fibers or components.

Figure 6A:
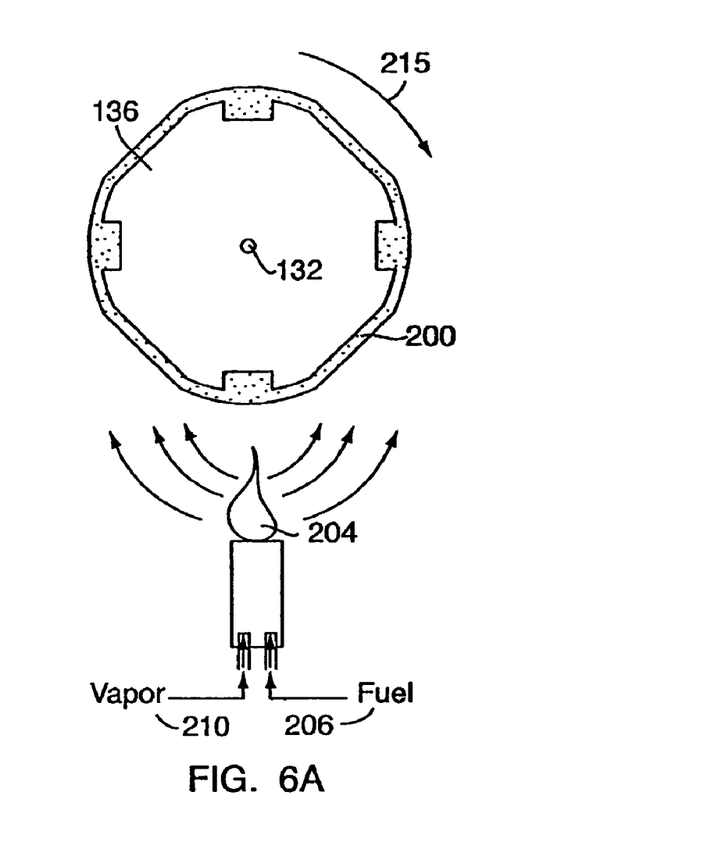
FIG. 6A illustrates depositing glass soot on a preform having a preform cladding that includes slots and flat areas.
Figure 6B:
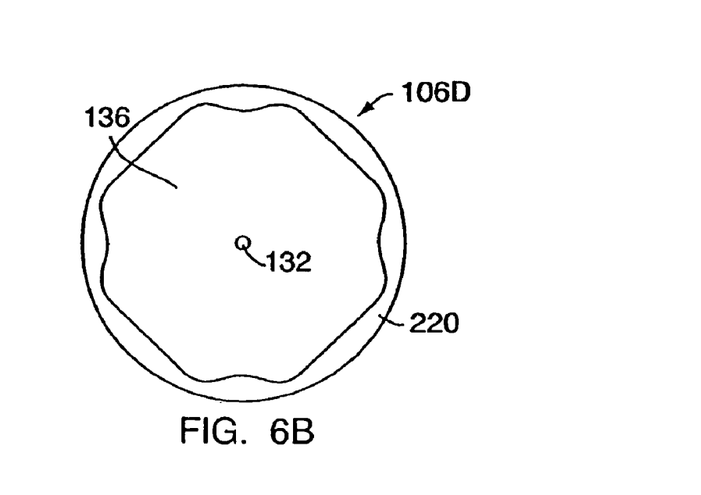
FIG. 6B illustrates a cross section of the preform of FIG. 6A after heating to sinter the glass soot to form a preform outer layer.

With reference to FIG. 6A, in yet another approach, glass soot 200 is deposited on the preform cladding layer 136. The glass soot 200 can be produced by a flame 204 fed by a fuel 206 and a suitable chemical vapor 210. The chemical vapor can be silicon tetrachloride mixed with a fluorine bearing material or boron bearing material, such as $BCl_3$, $BBr_3$, $SiF_4$, or $SF_6$. The preform cladding layer 136 can be rotated, as indicated by reference numeral 215, to promote even distribution of the glass soot 200. The glass soot 200 can then be heated to sinter the soot and to form a preform 106D having the preform core 132, the preform cladding 136, and a preform outer layer 220, as shown in FIG. 6B, showing the preform in cross section. The foregoing method can produce a glass preform 106D having an outer layer 220 that is more circular, or at least having depressions or indentations of reduced depth, such that the shaping operation, such as is shown in FIG. 5D, may be avoided or, if the preform 106D is shaped, less material of the outer layer 220 will require removal. The preform 106D can then be drawn, generally as shown in FIG. 3A, into an optical fiber article having a core, cladding and outer layer. The resultant optical fiber article would generally appear as shown in FIG. 5E.

It will thus be seen that the invention efficiently achieves the objects set forth above, as well as those apparent from the foregoing disclosure. It is intended that all matter included in the above disclosure be interpreted as illustrative and not in a limiting sense, as one of ordinary skill in the art, apprised of the disclosure herein, can make certain changes in the above constructions without departing from the scope of the invention. For example, sections other than straight sections and inwardly curved sections can be deliberately included in the outer circumference of the cladding, and the straight sections need not necessarily be tangential to a circle about the center 54 of the optical fiber article, as shown in FIGS. 2A and 2B. As another example, the jacket 150 need not be limited to glass, but can include other materials understood to be suitable by one of ordinary skill in the art, apprised of the disclosure herein.

Accordingly, it is understood that the following claims are intended to cover generic and specific features of the invention described herein, and all statements of the scope of the invention which as a matter of language might be said to fall therebetween.

We claim:

1. A method of forming a fiber optic article, comprising:
   providing a first preform having a core and a cladding disposed about the core, the cladding having a non-circular outer boundary and an index of refraction;
   disposing a glass jacket about the cladding, the glass jacket having an outer boundary and an index of refraction that is less than the index of refraction of the cladding;
   shaping the outer boundary of the glass jacket such that the outer boundary is substantially circular.

2. The method of claim 1 comprising:
   drawing the preform and the glass jacket to form an optical fiber.

3. The method of claim 1 wherein the outer boundary of the cladding comprises at least one straight section.

4. The method of claim 1 wherein the outer boundary of the cladding comprises at least one inwardly curved section.

5. The method of claim 1 wherein the outer boundary of the cladding comprises a D-shape.

6. The method of claim 1 wherein the outer boundary of the cladding comprises a star shape.

7. The method of claim 1 wherein the outer boundary of the cladding is shaped as a polygon.

8. The method of claim 1 wherein the outer boundary of the cladding comprises a plurality of perturbations.

9. The method of claim 1 wherein the fiber optic article comprises a rare earth material.

10. The method of claim 1 wherein shaping the outer boundary of the jacket comprises machining.

11. The method of claim 1 wherein shaping the outer boundary of the jacket comprises grinding.

12. Fiber optic article, comprising:
    a core;
    a glass cladding disposed about said core and for receiving pump light, said glass cladding having a non circular outer boundary for enhancing the intersection of pump light with said core, said glass cladding including a first index of refraction;
    a glass layer disposed about the cladding, said glass layer having a thickness and second index of refraction, said second index of refraction being less than said first index of refraction; and
    said thickness being such that the outer boundary of the glass layer was non circular when said glass layer was conformed to said cladding; and
    wherein the outer boundary of said layer is substantially circular.

13. The fiber optic article of claim 12 wherein said article is an optical fiber.

14. The fiber optic article of claim 13 comprising a rare earth material.

15. The fiber optic article of claim 14 wherein said rare earth material comprises ytterbium.

16. The fiber optic article of claim 12 wherein said outer boundary of said glass cladding comprises at least one straight section.

17. The fiber optic article of claim 12 wherein said outer boundary of said glass cladding comprises at least one inwardly curved section.

18. The fiber optic article of claim 12 wherein said outer boundary of said glass cladding comprises a D-shape.

19. The fiber optic article of claim 12 wherein said outer boundary of said glass cladding is shaped as a polygon.

20. The fiber optic article of claim 12 wherein said outer boundary of said glass cladding comprises a plurality of perturbations.

21. An optical fiber, comprising:
a core;
a glass cladding disposed about said core and for receiving pump light, said glass cladding having a non circular outer boundary for enhancing the intersection of pump light with said core, said glass cladding including a first index of refraction and maximum and minimum diameters;
a glass layer disposed about the cladding, said glass layer having a second index of refraction that is less than said first index of refraction, said glass layer having an outer boundary having a diameter; and
wherein the ratio of said diameter of said boundary of said glass layer to either of said diameters of said boundary of said glass cladding is no greater than 1.25 and wherein said outer boundary of said layer is substantially circular.

22. The optical fiber article of claim 21 wherein said ratio of said diameter of said boundary of said glass layer to one of said diameters of said boundary of said glass cladding is no greater than 1.13.

23. The optical fiber of claim 21 wherein said fiber comprises a rare earth material.

24. The optical fiber of claim 21 wherein said outer boundary of said glass cladding comprises at least one straight section.

25. The optical fiber of claim 21 wherein said outer boundary of said glass cladding comprises at least one inwardly curved section.

26. The optical fiber of claim 21 wherein said outer boundary of said glass cladding comprises a D-shape.

27. The optical fiber of claim 21 wherein said outer boundary of said glass cladding comprises a star shape.

28. The optical fiber of claim 21 wherein said outer boundary of said glass cladding is shaped as a polygon.

29. The optical fiber of claim 21 wherein said outer boundary of said glass cladding comprises a plurality of perturbations.

* * * * *